Dec. 28, 1954  L. A. McKAY  2,697,903
ADJUSTABLY MOUNTED STALK CUTTING IMPLEMENT
Filed Aug. 9, 1950  4 Sheets-Sheet 1

INVENTOR
Leon A. McKay
BY
Mason, Fenwick & Lawrence
ATTORNEYS

Dec. 28, 1954 L. A. McKAY 2,697,903
ADJUSTABLY MOUNTED STALK CUTTING IMPLEMENT
Filed Aug. 9, 1950 4 Sheets-Sheet 3

INVENTOR
Leon A. McKay

BY Mason, Fenwick & Lawrence
ATTORNEYS

Dec. 28, 1954  L. A. McKAY  2,697,903
ADJUSTABLY MOUNTED STALK CUTTING IMPLEMENT
Filed Aug. 9, 1950  4 Sheets-Sheet 4
Fig. 6
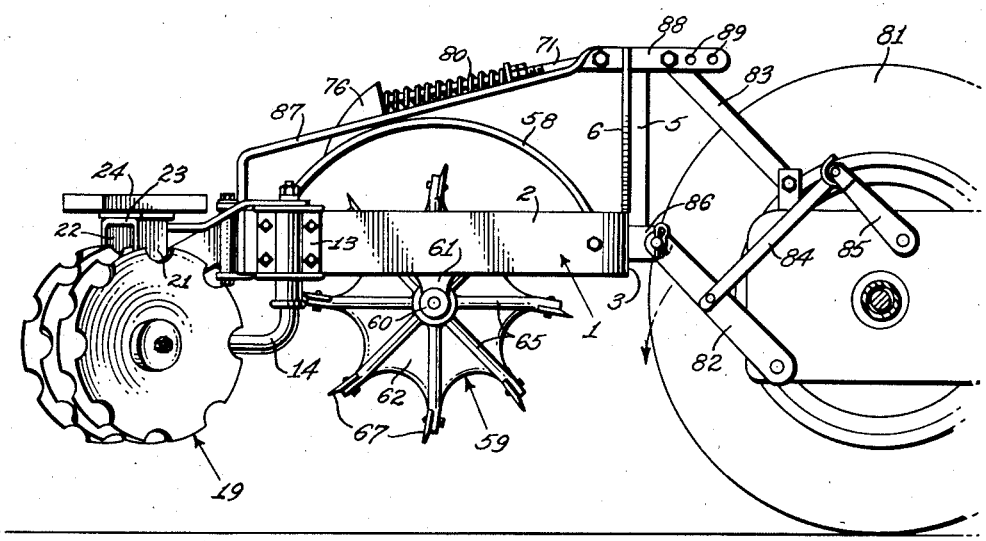
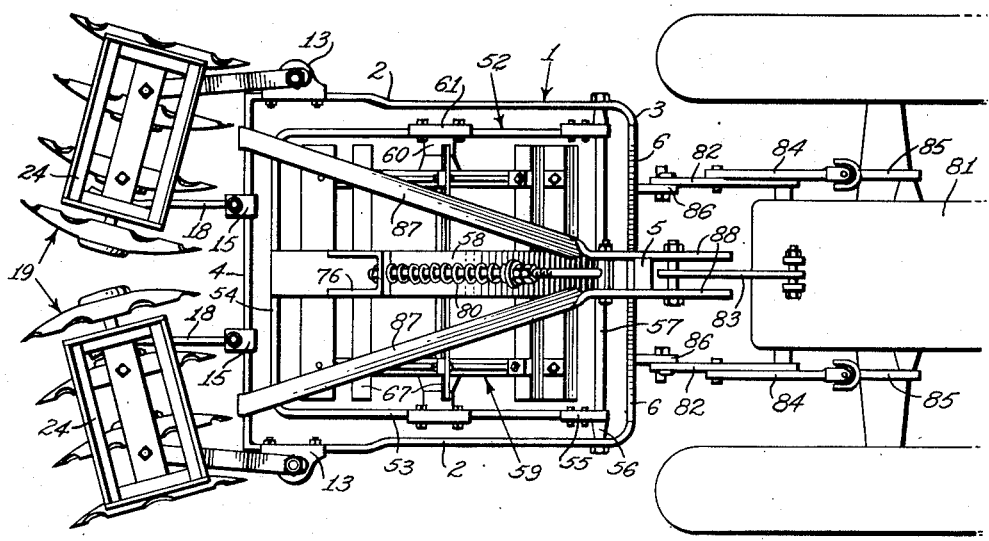
Fig. 7
INVENTOR
Leon A. McKay
BY Mason, Fenwick & Lawrence
ATTORNEYS

United States Patent Office 2,697,903
Patented Dec. 28, 1954

2,697,903

ADJUSTABLY MOUNTED STALK CUTTING IMPLEMENT

Leon A. McKay, Dunn, N. C., assignor to The John A. McKay Mfg. Co., Inc., a corporation of North Carolina Application August 9, 1950, Serial No. 178,495

2 Claims. (Cl. 55—118)

This invention relates to a combined stalk cutter and harrow.

The general object of the invention is to provide an implement of the type indicated by the title, in which either the harrow unit or the stalk cutting unit may be used singly, but when used either singly or combined, the knife reel of the stalk cutter is floatably mounted so that the cutting pressure of the knives may be regulated by suitable adjusting means independently of the ground support afforded by the presence of the harrow, or by the tractor which may carry the implement.

Another object of the invention is the provision of a combined stalk cutter and harrow in two forms which differ from one another only to the extent necessitated by the manner in which they are adapted to be drawn, both including a main frame which directly carries the harrow unit, and both including a secondary frame hingedly mounted in the main frame and carrying the knife reel, with adjustable spring means reacting between the main and secondary frames for controlling the penetrating pressure of the knives which are at the periphery of the knife reel. In one instance the implement is supported as a cantilever behind the tractor in known manner, the tractor hitch lifting the entire implement clear of the ground for transporting it and lowering it to the desired working depth of the harrow, the elevation of the implement as a whole being controlled by the tractor. In this case the main frame is made short to bring the weight of the implement close to the tractor hitch. In the other form, the front end of the main frame is freely suspended at the rear of the tractor so that vehicle wheels on the implement itself are required to support it when being taken to and from the field, which vehicle wheels are retractable to bring the harrow and stalk cutting reel into working position. In this form of the invention the forward part of the main frame is made long so that ground inequalities passed over by the vehicle wheels will transmit the minimum of movement and stress to the tractor hitch.

Other objects of the invention will appear as the following description of preferred and practical embodiments thereof proceed.

In the drawings which accompany and form a part of the specification, and throughout the several figures of which the same reference characters have been used to denote identical parts:

Figure 6 is a side elevation, on a reduced scale, of a slightly modified form of the invention, in which the implement is lifted and lowered by means of the tractor hitch;

Figure 7 is a plan view of the implement shown in Figure 6.

Figure 1:
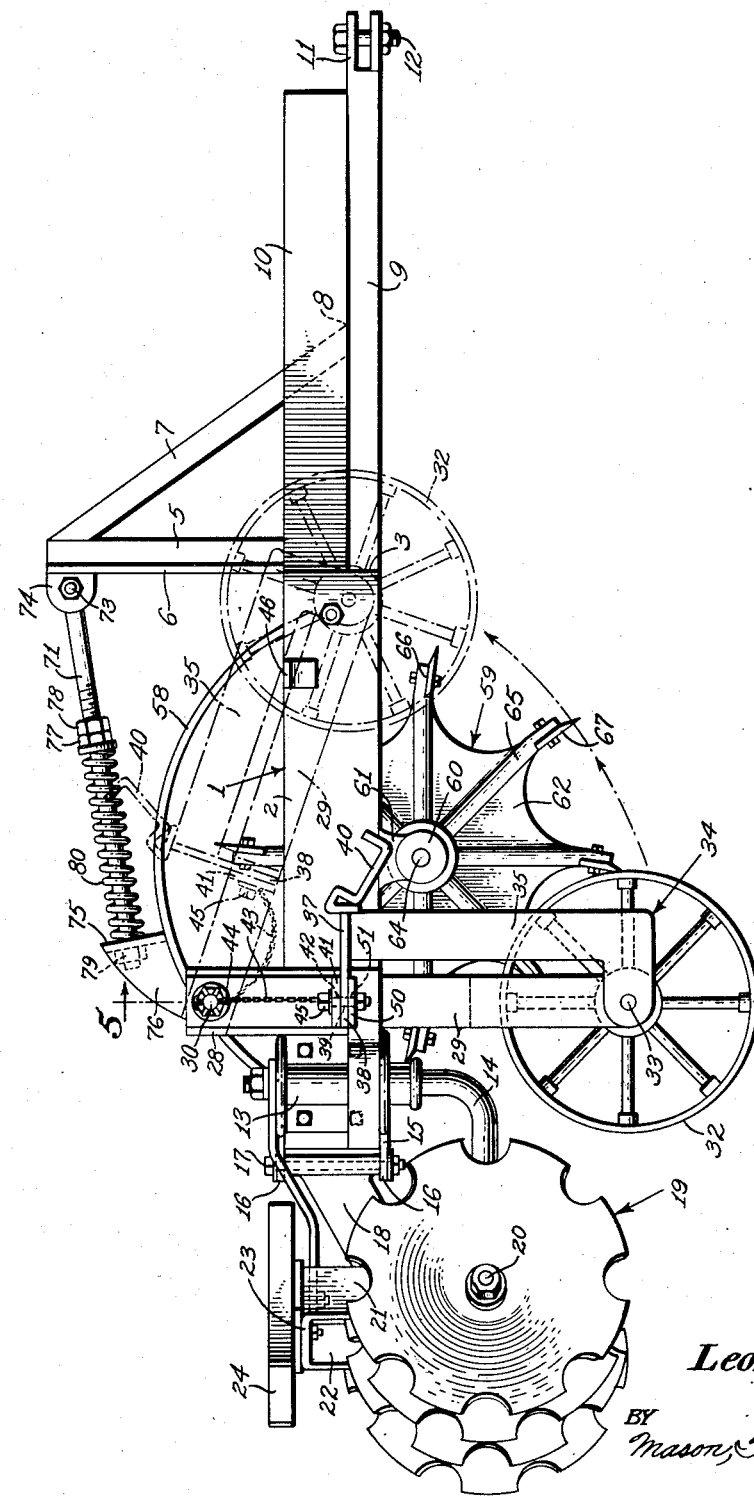
Figure 1 is a side elevation of a combined stalk cutter and harrow, embodying the principles of the invention, the form shown being the one in which vehicle wheels are provided, the vehicle wheel and retracting mechanism being shown in ground engaging position in full lines, and in retracted position in broken lines.

Referring now in detail to the several figures, and first adverting to that form of the invention shown in Figures 1 to 5, inclusive, the numeral 1 represents the main frame as a whole, which includes a substantially rectangular portion constituted by the side members 2, front member 3, and rear member 4. This frame is of substantial depth, as indicated by the line $a$ in Figure 3. A vertical post 5 is welded to the middle of the front member 3 on the outside of said member, said post being laterally braced by the struts 6, and being forwardly supported by the inclined brace 7. The foot 8 of said brace is welded to a tongue 9, the rear end of said tongue being welded to the front member 3. The tongue is laterally braced by means of the inclined struts 10, which are welded to it at the front and to the front member 3 at the rear. The tongue has a lug 11 at its front end, through which freely passes a bolt 12, by means of which the implement is pivotally supported with respect to the rear of a tractor.

The side members 2 of the main frame have the bearing blocks 13 bolted thereto near the rear, said bearing blocks having vertical bores in which the outer harrow arms 14 are journaled. The rear member 4 carries a pair of spaced shackles 15, symmetrically positioned with respect to the medial longitudinal line through the implement, and having upper and lower ends 16 perforated to receive the bolts 17, upon which the inner harrow supports 18 are pivotally mounted. The harrow comprises similar right and lefthand units 19, normally mounted in oppositely inclined relation to the longitudinal medial line of the implement. The harrow units each comprise a shaft 20, journaled in a bearing in the rear end of the arm 14, and a bearing carried in the member 27, to which the support 18 is bolted. An inverted U-shaped support, the legs of which are designated by the reference characters 21 and 22, is carried by the shaft 20. The transverse part 23 of said inverted U-shaped member supports a weight box 24.

The inclination of the harrow unit may be adjusted by means of the series of holes 25 in the support 18, any one of which may be selectively engaged by the bolt 26 that secures said support 18 to the member 27.

The side members 2 also carry, fixed thereto, the vertical posts 28, against which the forks 29 of the vehicle wheels are pivotally mounted by the bolts 30.

Figures 3, 4, 5:
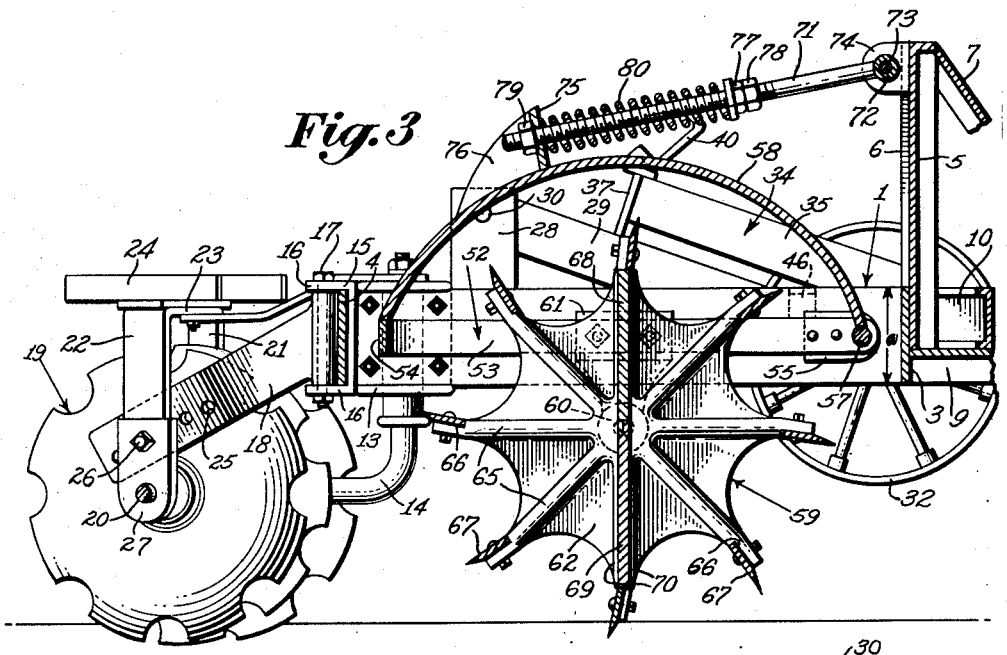
Figure 3 is a longitudinal section taken along the line 3—3 of Figure 2, the forward part of the implement being omitted.
Figure 4 is a fragmentary view in side elevation, showing the position of the ground engaging means associated with the retractable vehicle wheel for projecting the vehicle wheel into implement supporting position.
Figure 5 is a cross-section taken along the line 5—5 of Figure 1.

Figure 5 shows that the vehicle wheel fork 29 is a hollow member having a bottom brace 31 between its inner and outer members above their lower ends, the lower portions of said front and back members forming a bifurcation within which the vehicle wheel 32 is mounted on an axle 33.

The axle 33 extends beyond the sides of the bifurcated fork 29. On its extended ends is pivotally mounted a bent lever 34, consisting of similar spaced side plates 35, having angularly deflected ends 36 journaled on the axle ends. The opposite ends of said side plates 35 are bridged by an end plate 37, which extends in the same general direction as the deflected ends 36, forming a lug 38, having a bolt hole 39. On the forward side of the lever 34 at its free end a ground engaging cleat 40 in the form of a channel, is secured. The fork 29 is provided on its outer side at a distance from the axis of the axle 33 substantially equal to the distance of said axis from the lug 38, with an outward extending lug 41 having a bolt hole 42 of the same diameter as the bolt hole 39. Figure 1, in broken lines, shows that when the lever 34 is swung around in a counterclockwise direction, the lug 38 will nest above the lug 41 with the bolt hole 39 in registry with the bolt hole 42. Figure 4 shows that a flexible chain 43 is connected into the eye of the cotter pin 44, which holds the nut on the bolt 30, said chain being connected to a bolt 45, which can be slipped through the aligned bolt holes 42 and 39 to hold the lever 34 in place.

The side members 2 of the main frame also have the outwardly extending lugs 46 at opposite sides, which as will appear, serve to hold the vehicle wheels off the ground when the combined harrow and stalk cutter, or either of its components, is in working position.

Brackets 47 extend from the points of juncture of the main frame side members 2 and rear member 4.

These brackets at their forward ends debouch into two parts, an outer part 48 which lies parallel to the front face of the fork 29 and close thereto, and a transverse part 49 which is secured to the rear face of the post 28 and acts as a stop to prevent the fork 29 from swinging beyond vertical position in a clockwise direction, as viewed in Figure 1. The outer part 48 of each bracket 47 has a lug 50 at the top, extending outward therefrom at right angles thereto, which also has a bolt hole 51 equal in size to bolt holes 39 and 42. Figure 1 in full lines shows that when the vehicle wheel fork 29 is in vertical position with the lever 34 in closed or folded relation with respect thereto, the three bolt holes 39, 42 and 51 align so that the bolt 45 may be passed through all of them, as shown in Figure 1. Since the lug 50 is fixed, the vehicle wheel is maintained in vertical ground-engaging position when the bolt 45 is in place, and the lever 34 is kept from dropping.

When it is desired to retract the vehicle wheels, the bolt 45 associated with each is removed, and the bent levers 34 are let down, that is, turned in a clockwise direction until they rest upon the ground; then the tractor is backed. This causes the forks 29 to cant or move away from their vertical position in a counter-clockwise direction, assuming the position shown in Figure 4, in which the harrow and knife reel have come down to the ground and taken the load of the implement off of the vehicle wheels. After the vehicle wheels have reached this position, they can readily be lifted by hand, one at a time. They are raised until the fork 29 contacts with the under side of the lug 46. While the fork is in this position the bent lever is turned in a counter-clockwise direction to the folded position shown in broken lines in Figure 1, until the lever engages the upper side of the lug 46, the lug being thus trapped between said fork and said lever. The bolt 45 is thrust into the aligned holes 39 and 42, which locks the retractable wheel in raised position.

When it is desired to raise the implement upon the vehicle wheels, the bent lever is let down to the position shown in Figure 4 with the cleat 40 in contact with the ground, and the tractor then moves forward. The cleat 40 will dig into the ground, becoming immobilized so that further movement of the tractor will cause the bent lever 34 to push backward against the axle 33 of the vehicle wheel, swinging the fork 29 in a clockwise direction until it is stopped by the transverse part 49 of the bracket 47. When the vehicle wheels have reached this position, the levers 34 are folded up into the position shown in full lines in Figure 1 and the bolt 45 inserted in the three aligned bolt holes of the respective lugs 38, 41 and 50.

The secondary frame 52 comprises a substantially rectangular U-shaped member having side members 53 and a rear member 54. At their forward ends the side members 53 are provided with reinforcing fittings 55 bolted thereto, said fittings having outwardly extending bosses 56, which serve to space the secondary frame equally from the sides of the main frame. The ends of the side members 53, and the fittings 55, including the bosses 56, are bored and receive the ends of the shaft 57. The ends of said shaft are journaled in the side members 2. A rigid arcuate strap 58 is welded to the middle of the shaft 57 at one end and at the other end to the middle of the rear member 54 of the secondary frame. The arcuate shape of this strap is to permit it to clear the path of rotation of the knife reel 59, which is journaled in bearings 60, carried in brackets 61, mounted at middle points on the side members 53. The knife reel 59 has no axle passing therethrough, being constituted by headers 62, having hubs 63 from which project stub shafts 64, which are journaled in said bearings. The headers are formed with radiating ribs 65, having knife seats 66 at their outer ends. The ribs of the two heads are in similar phase and are bridged by knives 67, bolted in said seats. Said knives are beveled on one side, this being the trailing side. Along one diametrical plane, the space within the knife reel is completely closed by a partition consisting of two boards 68 and 69, meeting at the center in a ship-lap or other suitable joint, and ending at the base of two of the adjacent knives. The boards are retained at their ends in channels defined by parallel ribs 70, formed on the two heads. The function of the partition is to prevent clogging of the knife reel. In the absence of the partition cut stalks thrown up by the rotation of the knife reel between the knives tumble around in a constantly accumulating mass, which finally prevents sufficient penetration of the knives. The presence of the partition causes the revolving knife reel to dash the stalks out in small quantities, keeping the inside of the knife reel substantially clear at all times. The weight of the secondary frame 52 and the parts that it carries normally transmits adequate pressure upon a single knife to cause that knife to penetrate the most tough and rank stalks. It is, however, undesirable to have the pressure upon the knife greater than is necessary for proper cutting, since undue pressure of the knife into the soil simply prematurely dulls the knife. An adjustment is therefore provided by means of which the pressure of the knife reel may be adjustably regulated to decrease, or if desired to increase the pressure upon the knife. This adjustment comprises a rod 71 having an eye 72 at one end, journaled on a horizontal pin 73 retained between two lugs 74, projecting rearwardly from the top of the post 5. Said rod is thus swingable in a vertical plane and extends rearwardly, having its free end passing through the transverse part 75 of an abutment 76, welded to the strap 58. The hole in the part 75 through which the rod passes is a little larger than the diameter of the rod, giving some slight freedom of swinging movement of the rod relative to said abutment. The rod 71 is threaded from its free end for some distance toward the front. It has an adjustable nut 77 at the forward end of the threaded zone, backed by a lock nut 78. On its free end it has a nut 79 forming a head which engages the transverse part 75 of the abutment. A spring 80 surrounds the rod 71, being in compression between the nut 77 and the abutment. The pressure of the knife reel against the ground or against stalks being cut results in the rocking of the secondary frame 52 in an upward direction, causing the abutment to compress the spring. By adjusting the nut 77 the resistance of the spring to yielding to the upward thrust of the secondary frame is regulated. The spring pressure may be made so stiff that it acts as a rigid member, in which case the knife reel is held down by the full weight of the loaded implement.

Figures 6 and 7 show a form of the invention in which the combined stalk cutter and harrow is designed to be used with a tractor hitch of the type that lifts the implement bodily from the ground and holds it above the ground while the implement is being transported. This permits some simplification in the design of the implement, as it is not necessary to provide vehicle wheels nor the means for projecting and retracting them. Aside from the omission of these elements and some slight changes in the main frame, the implement shown in Figures 6 and 7 is the same as that shown in Figures 1 to 5, inclusive, a description of which occupies the foregoing part of the specification, which it is not deemed necessary to reiterate.

Referring in detail to Figures 5 and 6, the tractor 81 has a common type of hitch consisting of the substantially parallel links 82 and 83, the first named being operated by means of a connection 84 between its mid point and the end of a rocking lever 85, mechanically or hydraulically operated by the tractor. The links 82 and the connections associated therewith, including the rocking levers, are duplicated on opposite sides of the tractor. The upper link 83, as shown, is single and in the middle. The free ends of the links 82 and 83 are attached to the main frame of the tractor respectively along high and low axes.

Figure 2:
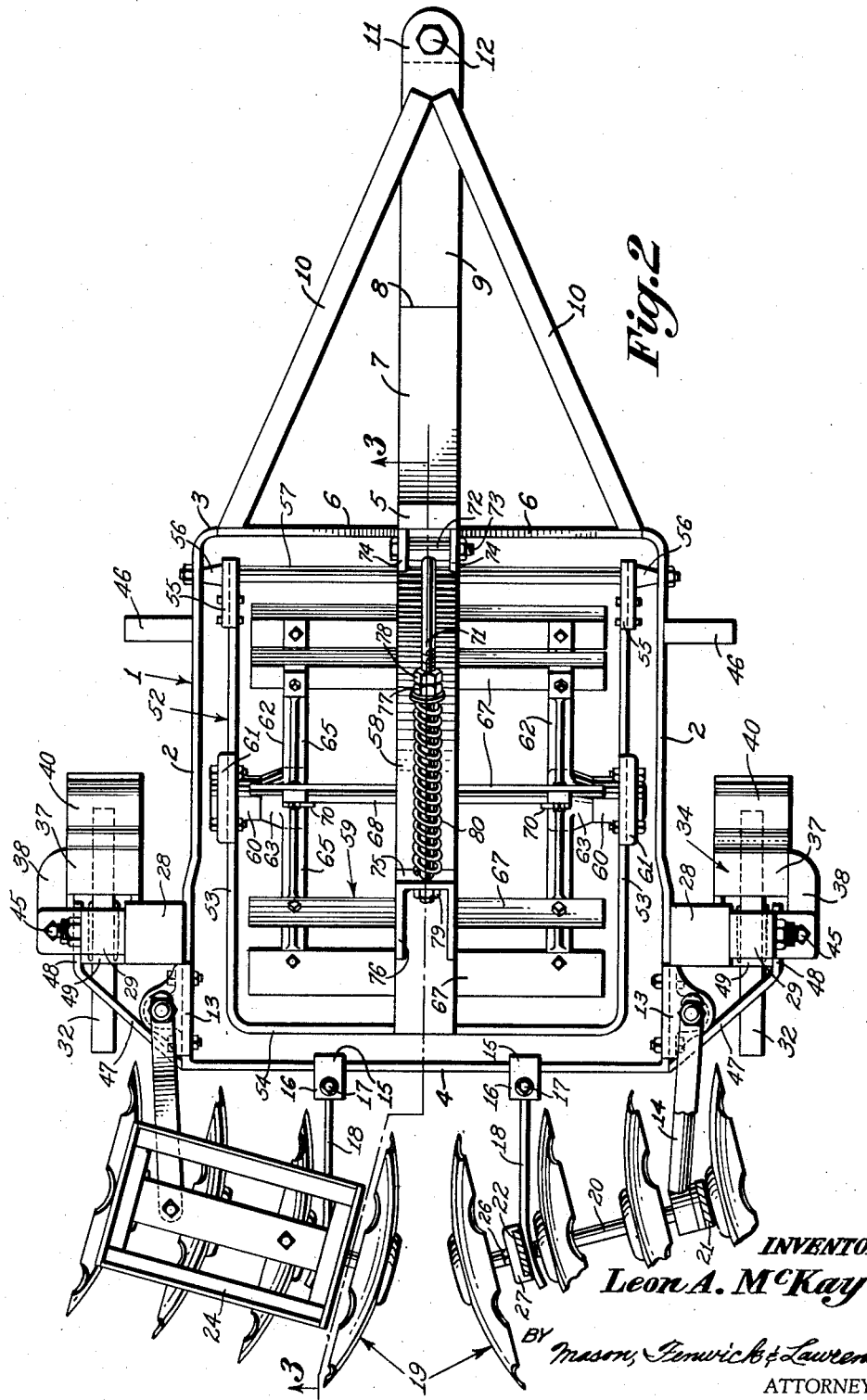
Figure 2 is a plan view of the implement shown in Figure 1.

The tongue 9 and the convergent struts 10 which form part of the main frame in Figure 2 are omitted in order to bring the weight of the implement as close as possible to the tractor hitch, since the latter is called upon to support the implement cantilever fashion.

The front member 3 of the main frame is provided with the spaced lugs 86 to which the links 82 are connected. A pair of forwardly convergent braces 87 are connected to the rear end of the main frame, becoming parallel toward the front, the parallel portions 88 being welded to the post 5 at the top, and continuing for a short distance forwardly of said post. Rows of aligned adjusting holes 89 are formed in the forwardly continuing portion 88, for adjustably supporting the implement, the link 83 being pivotally connected to a bolt which may be selectively inserted in any pair of aligned holes.

Incidentally, the parallel portions 88 of the braces 87 which lie to the rear of the post 5 are the equivalent of the lugs 74 in Figure 2, and serve a similar function in supporting the rod 71.

One pair of the holes 89 is preferably so located that the pivotal axes at the ends of the links 82 and 83 are at the corners of an imaginary parallelogram. This causes the hitch to lift the tractor from the ground parallel to itself, so that the lower edge of the harrow disks and of the knives of the knife reel touch the ground at about the same level. When the link 83 is connected in one of the other pair of holes 89, the implement is tilted down toward the rear so that when it is let down to ground level the harrow disks touch the ground prior to the knives of the knife reel. The adjusting means, which includes the spring 80, adjusts the pressure of the knives against the stalks being cut to any desired value below the full ground supported weight of the implement, similarly to the first described form of the invention.

While I have in the above description disclosed what I believe to be preferred and practical embodiments of the invention, it will be understood by those skilled in the art that the specific details of construction and the arrangement of parts, as shown and described, are by way of example and not to be construed as limiting the scope of the invention.

What I claim as my invention is:

1. Stalk cutting implement comprising a main frame adapted to be solely supported at the front by a tractor and adapted to be lifted from the ground, and having means unitary therewith for supporting it at the rear, said main frame including front, back and side members enclosing an opening, a post constituting part of said main frame extending upward at the front thereof, means bridging said main frame member transversely at the front providing a transverse axis, a secondary U-shaped frame within said main frame including side members and a rear end member, swingably mounted about said transverse axis, a knife reel rotatably mounted in bearings carried by the side members of said secondary frame having transverse knives at spaced intervals about its periphery, a rigid member overlying said knife reel extending longitudinally of said secondary frame, fixed at one end to the rear member of said secondary frame, forming part thereof, and secured at its other end to said axis providing member, said knife reel being freely gravitationally engageable with the ground when said rear supporting means is ground supported, and means for adjusting said cutting pressure comprising a lug on said overlying member adjacent the free end of said secondary frame, a rod pivotally connected to said post adjacent the top thereof, freely extending through a hole in said lug and having a retaining head on the extending portion, an adjustable collar on said rod and a coil spring under compression about said rod reacting between said collar and said lug, said rod being the means for sustaining said secondary frame when said main frame is lifted from ground supported position.

2. Agricultural implement of the stalk cutting type in which the frame that supports the stalk cutting instrumentality is adapted to be solely supported at the front by a tractor in such manner as to be swingable in a vertical plane, normally ground supported to the rear of the tractor by the stalk cutting instrumentality, and being swingable upward to lift the stalk cutting instrumentality from the ground for purpose of transportation, said implement comprising a frame including spaced parallel side members, said side members having fixed thereto, transversely aligned outwardly extending lugs adjacent their forward ends, transversley aligned vertical upwardly extending posts at a distance rearwardly of said limit lugs having planiform outwardly directed faces in parallel planes, said side members having brackets contiguous to said posts with outwardly projecting stops at the rear of said posts and perforated lugs projecting outwardly from said planiform faces, retractable vehicle wheel units, one for each post, for swinging said frame upwardly to lift the stalk cutting instrumentality above ground level, each unit comprising a fork bifurcated at its lower end having a vehicle wheel journally mounted in the bifurcation, each fork having a planiform face in surface engagement with the planiform face of the corresponding post, said forks being coaxially pivoted to the respective posts and having a range of swing between said stops and said limit lugs, and having a perforated lug which registers with the perforated bracket lug when said unit is against said stop, a lever for each fork having its lower end pivotally connected thereto coaxial with the vehicle wheel, said lever having an intermediate portion offset upwardly from its lower end portions so as to lie spaced forwardly from said fork when swung upwardly into a position longitudinally of said fork, alternatively when said fork is against said stop or against said limit lug, said lever having a perforated lug at its top offset toward said fork and positioned to be registrable with the perforated fork and post lugs when said fork is against said stop, said limit lug being embraceable between said fork and lever with said fork and lever lugs in registry for supporting said fork by means of said limit lug in said second mentioned alternative position, a bolt flexibly suspended from said post for alternating insertion through the registering apertures of said bracket, fork and lever lugs when said fork is against said stop, or through said fork and lever lug when said fork is against said limit lug, said lever having ground gripping means at its upper end for engaging the ground when the fork is released from the limit lug, thrusting against the ground when the implement is moved backward for forcibly swinging said fork rearwardly against said stop.

References Cited in the file of this patent

UNITED STATES PATENTS

| Number | Name | Date |
|---|---|---|
| 1,000,262 | Harrington | Aug. 8, 1911 |
| 1,005,697 | Diestelmeier et al. | Oct. 10, 1911 |
| 1,247,018 | Sharp | Nov. 20, 1917 |
| 1,282,313 | Swaim et al. | Oct. 22, 1918 |
| 1,329,582 | Cornell | Feb. 3, 1920 |
| 1,628,730 | MacKay et al. | May 17, 1927 |
| 1,650,472 | Smith | Nov. 22, 1927 |
| 2,356,876 | Newkirk | Aug. 29, 1944 |
| 2,525,719 | Phillips | Oct. 10, 1950 |